Nov. 18, 1930.  F. C. EMMES ET AL  1,781,835
ILLUMINATED FLOWER VASE
Filed June 12, 1929

Inventor
FRANK C. EMMES
HENRY J. KNOPP

By Irving L. McCathran
Attorney

Patented Nov. 18, 1930

1,781,835

UNITED STATES PATENT OFFICE

FRANK C. EMMES AND HENRY J. KNOPP, OF BRUSSELS, WISCONSIN

ILLUMINATED FLOWER VASE

Application filed June 12, 1929. Serial No. 370,374.

This invention appertains to flower vases of the type employed on the interior of automobiles and one of the primary objects of our invention is the provision of novel means for illuminating an automobile suspended flower vase, so as to provide means not only for enhancing the appearance of the vase and the flowers therein, but also as means for illuminating the car body instead of the usual dome light.

Another important object of our invention is the provision of a novel supporting bracket for the flower vases of automobiles, the bracket carrying a lamp socket for engaging and extending into the flower vase for permitting the illumination thereof, the socket forming an effective means in conjunction with the bracket for holding the vase in proper position.

A further salient object of our invention is the provision of a bracket or base plate for connection with the wall of the body of an automobile having a supporting loop or arm struck out therefrom and a lamp socket thereon below the loop or arm for extension into an aperture formed in the flower vase, the loop or arm receiving a split band for engaging about the vase adjacent to the upper end thereof.

A still further object of our invention is to provide an improved flower vase and support therefor of the above character, which will be durable and efficient in use, one that will be simple and easy to manufacture, and one which can be placed upon the market and incorporated with an automobile at a small cost.

With these and other objects in view, the invention consists in the novel construction, arrangement and formation of parts, as will be hereinafter more specifically described, claimed, and illustrated in the accompanying drawing, in which drawing:

Referring to the drawings in detail, wherein similar reference characters designate corresponding parts throughout the several views, the letter A generally indicates my improved flower vase, B the support therefor and C the wall of the body of an automobile with which the vase can be associated.

Figure 1:
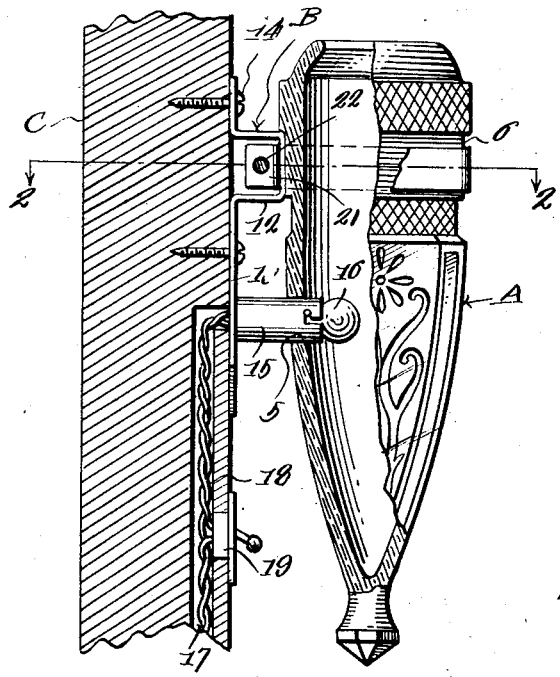
Figure 1 is a side elevation of the improved vase and holder showing the same connected to the wall of the body of an automobile, the wall being shown in section, parts of the vase and support thereof being shown broken away and in section.
Figure 3:
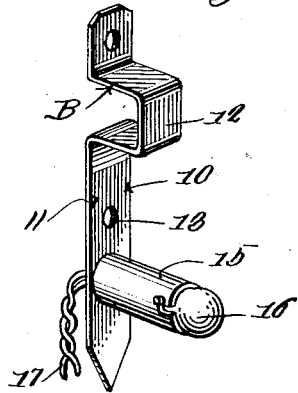
Figure 3 is a detail perspective view of the supporting bracket showing the socket carried thereby.
Figure 2:
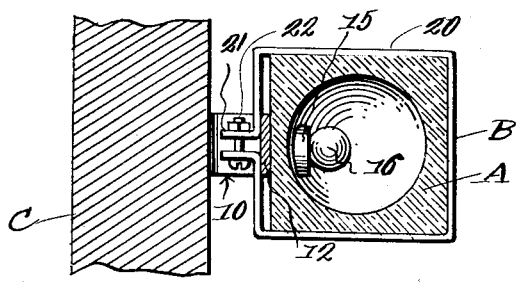
Figure 2 is a horizontal section taken on the line 2—2 of Figure 1 looking in the direction of the arrows illustrating the split band for engaging about the vase and connected with the supporting bracket.

The flower vase A can be of any desired shape and ornamented in any preferred way and is of the general character employed for holding flowers in automobiles and in accordance with our invention the vase A at a point intermediate its ends is provided with an opening 5 for a purpose which will be later described. Above the opening 5 and adjacent to but spaced from the upper end thereof the vase is provided with a groove or smooth portion 6, the purpose of which will also be later described.

The improved supporting means B for the vase A comprises a bracket or base plate 10, which can be formed of sheet metal or the like. This bracket or base plate 10 includes an elongated body 11 having a substantially U-shaped loop or arm 12 struck out therefrom adjacent to the upper end thereof. The body 11 above and below the loop or arm 12 is provided with openings 13 for the reception of fastening elements 14 for permitting the bracket or base plate to be secured to the wall C of the motor vehicle. Below the arm 12 the body 11 of the bracket 10 has rigidly secured thereto a socket 15 for the reception of an incandescent lamp bulb 16. It is to be noted that the socket 15 is formed relatively long and extends an appreciable distance beyond the outer end of the U-shaped loop or arm 12. The wall C of the automobile can be provided with a channel 17 for receiving the wires 18 for the socket 15 and the wall can also support a switch 19 incorporated in the length of one of the wires for controlling the bulb 16.

In connection with the bracket 10 we employ a split band 20 for encircling the vase A around the smooth or grooved portion 6 thereof and the terminals of the band 20 have formed thereon laterally extending ears 21 which receive a tightening bolt and nut 22. The band 20 is constructed to conform to the configuration of the vase and in the present instance I have shown the band of substantially square shape in view of the shape of the vase in this particular illustration, but the band can be of circular shape when a vase of circular shape in cross section is used. The band 20 is received within the U-shaped loop or arm 12 and it is obvious that when the nut bolt 22 is tightened, the band will hold the vase in place against the said loop or arm 12, which also acts in the nature of a housing for receiving the ears 21 and the nut and bolt 22. The socket 15 is snugly received in the opening 5 in the vase and projects into the vase a considerable distance, as clearly shown in Figure 1. The socket 15 engages the walls of the opening 5 and thus forms a support for the vase in conjunction with the bracket and split band 20.

The light 16 in conjunction with the vase forms a very attractive article and effectively shows off the vase and the flowers therein, particularly so if the vase is formed of colored glass. The vase and bulb 16 also forms means for illuminating the interior of the body of the automobile and thus eliminates the necessity of utilizing the ordinary dome light for this purpose.

When it is desired to remove the vase for any reason the nut and bolt 22 are removed from the ears 21 of the split band 20 and the band is then spread and removed from the U-shaped loop or arm 12 after which the vase is pulled straight off of the socket 15. The bulb 16 can be removed and a new bulb readily inserted when the vase is removed from the socket and it is obvious that the vase can be quickly associated with the socket and bracket.

Changes in details may be made without departing from the spirit or the scope of this invention, but what we claim as new is:

1. The combination with a flower vase having an opening therein intermediate the ends thereof, of a support for the vase including a supporting bracket, a lamp socket carried by the bracket extending into the vase through the opening, and means encircling the vase above the socket engaging the bracket.

2. The combination with a flower vase having an opening therein at a point intermediate its ends, of a supporting bracket having a lamp socket projecting outwardly from one face thereof, extending into the vase through said opening, an incandescent lamp detachably connected with the socket, and a split band engaging about the vase adjacent to the upper end thereof and connected with said bracket.

3. The combination with a flower vase having an opening therein at a point intermediate its ends, of a supporting bracket, means for securing the bracket to a support, the bracket having a substantially U-shaped arm struck out from one face thereof, a lamp socket secured to the bracket and projecting therefrom beyond the arm for the reception into the opening, an incandescent lamp disposed completely within the vase and connected with the socket, and a split band encircling the vase adjacent to the upper end thereof and extending through the U-shaped arm.

4. A supporting device for flower vases of automobiles comprising a bracket including a flat base plate, a substantially U-shaped arm struck out from the base plate, and an outwardly projecting lamp socket rigidly carried by the base plate and projecting beyond the arm.

In testimony whereof we affix our signatures.

FRANK C. EMMES.
HENRY J. KNOPP.